Jan. 13, 1959                    C. J. SMITH                    2,868,395
CAN STORAGE APPARATUS
Filed March 21, 1956                                      9 Sheets-Sheet 1

Jan. 13, 1959 C. J. SMITH 2,868,395
CAN STORAGE APPARATUS
Filed March 21, 1956 9 Sheets-Sheet 2

INVENTOR.
Clarence J. Smith
BY
Olson & Trexler
atty

Jan. 13, 1959 C. J. SMITH 2,868,395
CAN STORAGE APPARATUS
Filed March 21, 1956 9 Sheets-Sheet 4

INVENTOR.
Clarence J. Smith
BY:
Olson & Trexler
Attys.

Jan. 13, 1959 C. J. SMITH 2,868,395
CAN STORAGE APPARATUS
Filed March 21, 1956 9 Sheets-Sheet 6

INVENTOR.
Clarence J. Smith
BY:
Olson & Trexler
attys

United States Patent Office 2,868,395
Patented Jan. 13, 1959

2,868,395
CAN STORAGE APPARATUS

Clarence J. Smith, Rockford, Ill., assignor to W. F. and John Barnes Company, Rockford, Ill., a corporation of Illinois Application March 21, 1956, Serial No. 573,040

17 Claims. (Cl. 214—16)

The present invention relates to novel storage facilities, and, more particularly, to novel storage facilities especially adapted for accommodating cans or other articles.

At present, the majority of cans used are produced by can manufacturers and then shipped to various canners. However, it has been proposed to provide canners with the necessary can making machinery so that the cans may be produced and subsequently filled in the same plant. Differences in the rate of operation of can making machines and can filling machines and also the fact that one of these machines might have to be shut down for repairs or other reasons while the other machine is to be operated make it necessary to provide storage facilities for the cans or the like for receiving the cans from the can making machines and subsequently discharging the cans to the can filling machines. An important object of the present invention is to provide novel storage facilities particularly adapted for receiving cans or any other desired articles from a source of supply and for subsequently discharging the cans or articles as needed.

A more specific object of the present invention is to provide novel storage facilities including a large and relatively deep storage bin and means for depositing cans or any other articles which are susceptible of injury upon being dropped into the bin in a manner so as to prevent substantial free fall of the cans or articles into the bin regardless of whether or not the bin is empty or partially filled and thereby substantially reduce any possibility of the cans or articles becoming dented or injured.

Another object of the present invention is to provide novel storage facilities for cans or the like which is constructed so as automatically to pile the cans or the like generally uniformly across the large storage bin.

A further object of the present invention is to provide novel storage facilities of the above described type having movable bottom means for the bin for discharging cans or the like through an opening in the bin, which bottom means is sufficiently rugged to support a great weight of cans or the like piled thereon and is constructed and supported so that it may be relatively easily moved.

A more specific object of the present invention is to provide novel storage facilities of the above described type including a large storage bin having means for interrupting and slowing the descent of cans or the like during initial filling of the bin so as to reduce the possibility of injury to the cans.

Another more specific object of the present invention is to provide novel storage facilities constructed so that cans or the like may be initially discharged into any desired portion of a large storage bin in a manner which eliminates substantial free falling of the cans or the like and possible injury thereto.

A further object of the present invention is to provide novel storage facilities for cans or other desired articles having supply conveyor means extending along a large storage bin, such storage facilities being constructed so that the cans or the like may be removed from the conveyor means at any desired point along the storage bin for distribution throughout the bin.

Other objects and advantages of the present invention will become apparent from the following description and the accompanying drawings wherein.

Figure 2:
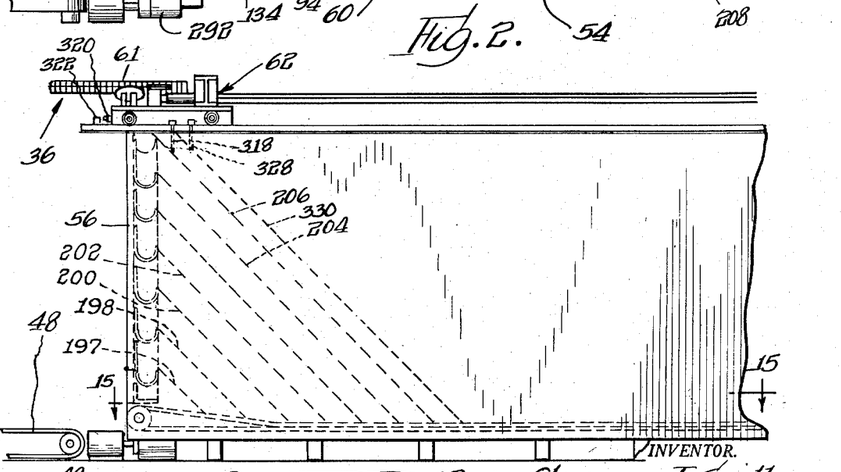
Fig. 2 is a fragmentary side elevational view of the structure shown in Fig. 1.
Figure 3:
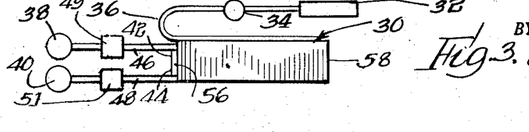
Fig. 3 is a diagrammatic view showing how the storage facilities of the present invention may be combined with can or article producing machines and can or article filling or processing machines.
Figure 4:
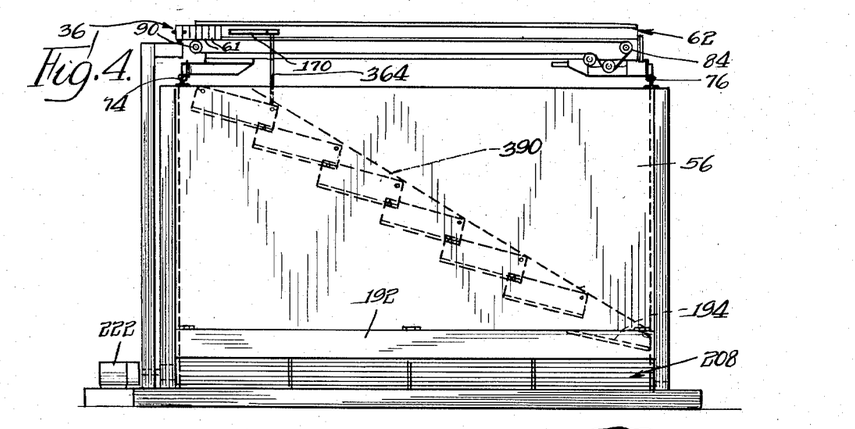
Fig. 4 is an end elevational view of the structure shown in Fig. 1.
Figures 5, 6:
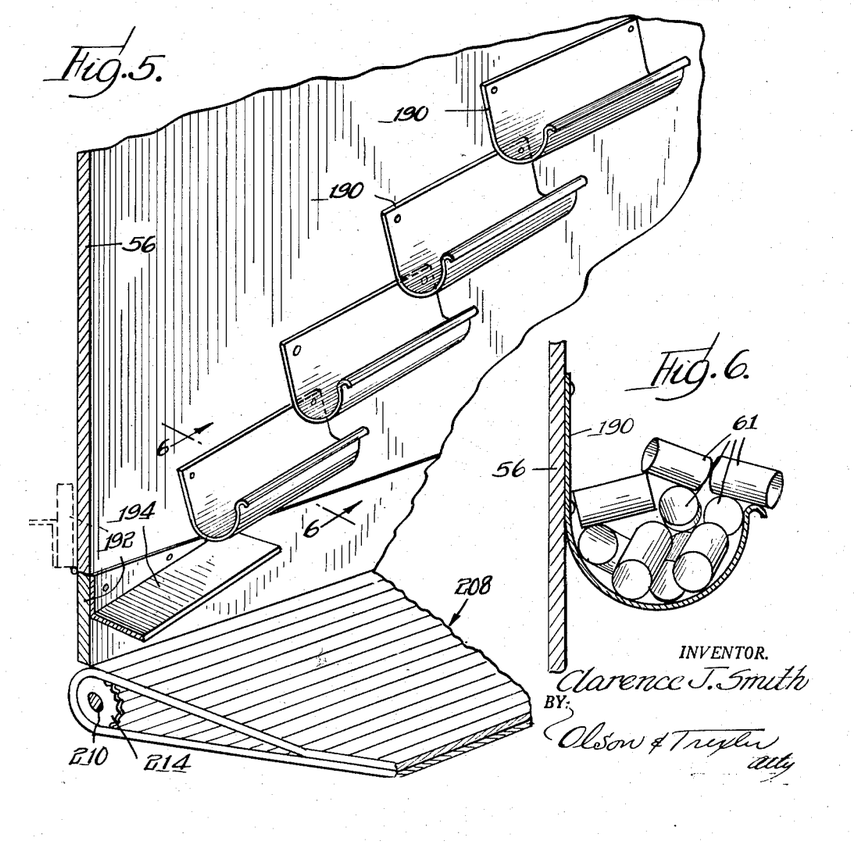
Fig. 5 is an enlarged fragmentary perspective view particularly showing means within the storage bin for preventing undue free falling of cans or the like during initial filling of the bin.
Fig. 6 is an enlarged fragmentary sectional view taken along line 6—6 in Fig. 5.

Referring now more specifically to the drawings wherein like parts are designated by the same numerals throughout the various figures, a storage structure 30 and elements thereof are shown in Figs. 1 through 18. Fig. 3 shows the storage structure 30 installed to receive cans from a body making machine 32 and an end applying machine 34, which cans are directed from the end applying machine to the storage structure by a suitable supply conveyor 36. The storage structure is adapted to deliver cans deposited therein to one or more filling machines 38 and 40 by means including conveyors 42 and 44 which receive the containers or cans from the storage structure and deposit them or other conveyors 46 and 48 that direct the cans to orientating units 49 and 51. While the storage structure will be described with particular reference to its use in an installation such as that shown in Fig. 3, it should be understood that various other uses of the structure may suggest themselves. For example, the storage structure may be mobile and may be mounted on a truck or a railroad car, not shown.

The storage structure includes a storage bin 50 having opposite sides 52 and 54 and front and back ends 56 and 58, respectively, see Figs. 1–3, 14 and 15. The storage bin is provided with a movable conveyor or bottom structure 60 which will be described in detail below. The conveyor 36 for supplying cans 61 or the like extends along the side 52 of the storage bin, and means 62 is provided for removing the cans from the supply conveyor and distributing the cans throughout the storage bin. As will be understood, the storge bin may be of any desired size, but it is contemplated that the bin will be large and may, for example, be about 100 feet long, 20 feet wide, and 14 feet deep. As will appear from the discussion below, the distributing means 62 is adapted to direct the cans so that they may be piled generally uniformly throughout the storage bin.

The distributing means 62 which is shown in detail in Figs. 7 through 12 comprises a carriage 64 adapted to be moved substantially from one end of the storage bin to the other. The carriage is provided with rollers 66, 68, 70 and 72 which ride on rails 74 and 76 mounted along the upper edges of the bin walls 52 and 54 by a plurality of brackets 78 and 80. A can conveyor belt 82 extends across the carriage 64 and transversely of the storage bin. The belt 82 extends around suitably mounted rollers 84, 86, 88 and 90 and is engaged by a tensioning roller 92. A motor and speed reducing unit 94 is mounted on the back of the carriage 64 for driving the conveyor belt 82. The unit 94 has a drive shaft 96 with a sprocket 98 thereon, and a chain 100 extends around the drive sprocket 98 and sprockets 102 and 104 respectively mounted on shafts 106 and 108 which also carry the conveyor rollers 84 and 86.

Figure 7:
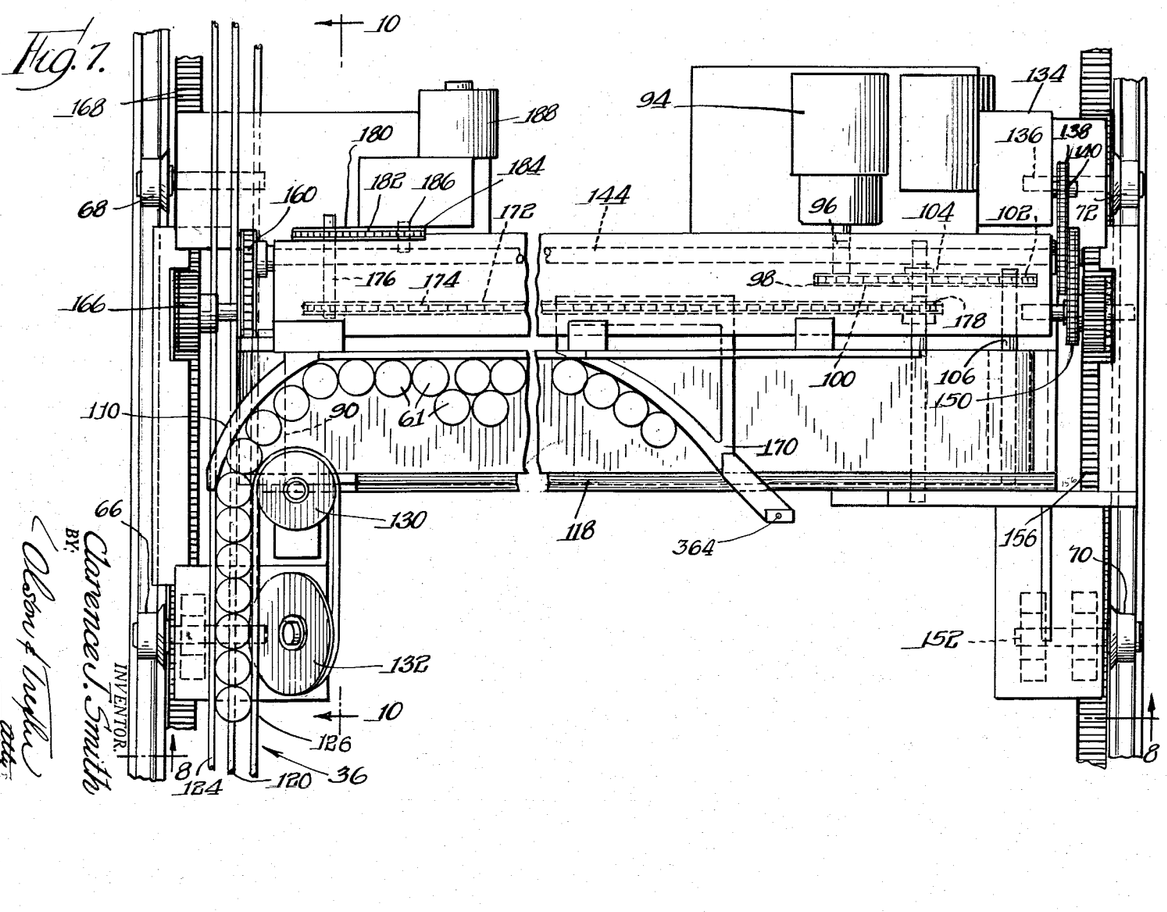
Fig. 7 is an enlarged fragmentary plan view showing a portion of the apparatus which is adapted to remove cans or the like from a supply conveyor and distribute the cans or similar articles transversely and longitudinally of the storage bin.
Figure 8:
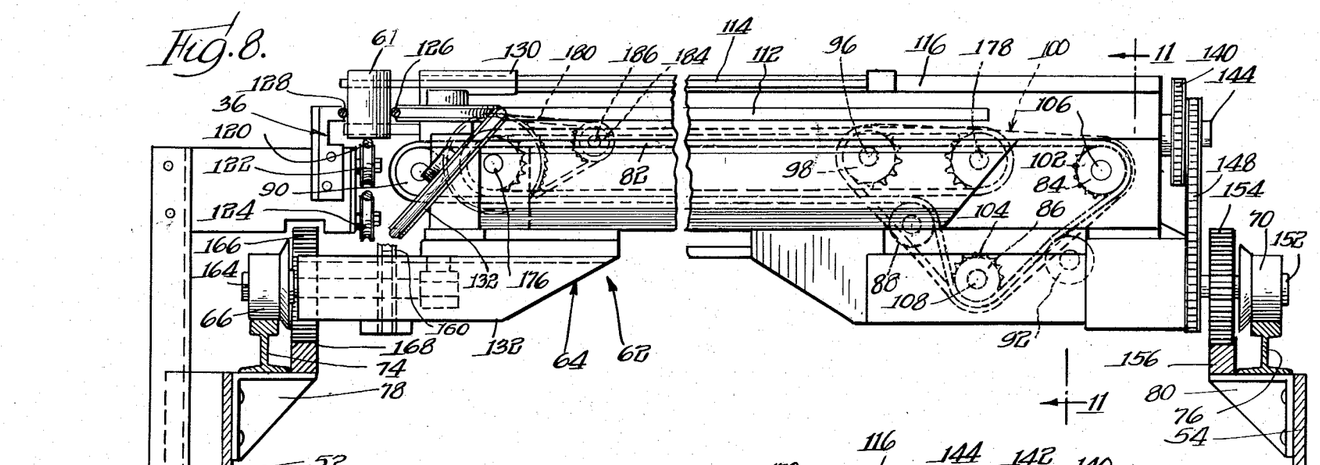
Fig. 8 is a sectional view taken along line 8—8 in Fig. 7.
Figure 9:
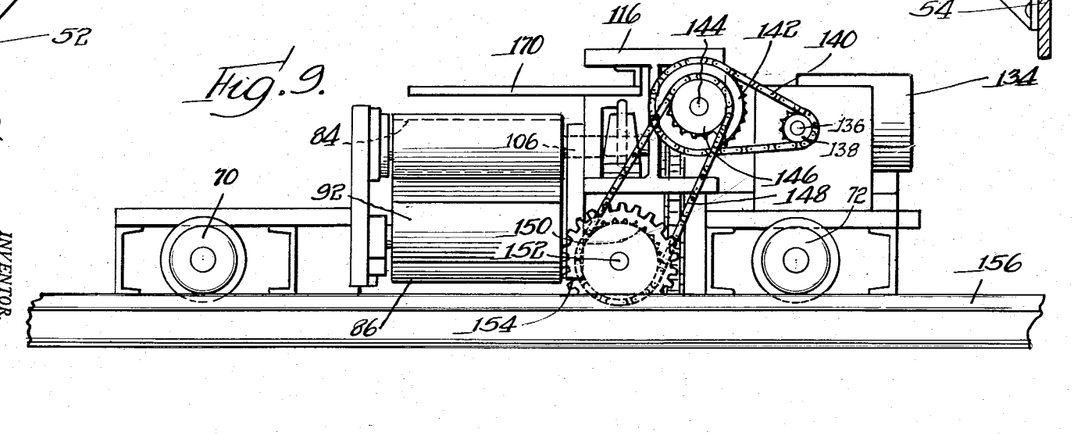
Fig. 9 is a fragmentary end elevational view of the structure shown in Fig. 7 as seen from the right end of the figure.

A curved stripper member 110 is mounted on the carriage above the conveyor belt 82 for traversing the supply conveyor 36 and directing the cans or articles from the supply conveyor onto the distributing conveyor. Guide rails 112 and 114 are suitably supported from a transverse frame member 116 of the carriage 64 along the back edge of the distributing conveyor 82, and the cans are discharged into the storage bin over a wear plate 118 disposed along the forward edge of the conveyor 82. The manner in which the cans are discharged and distributed will be more fully described below.

Figure 10:
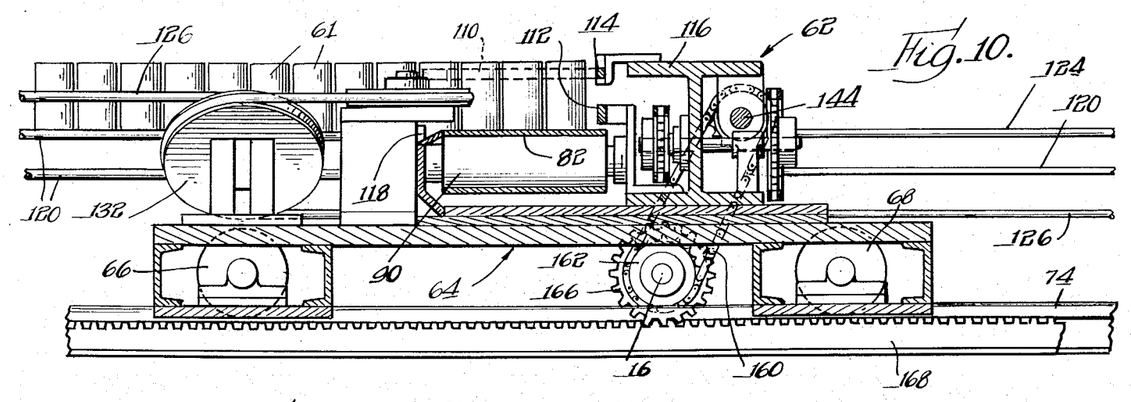
Fig. 10 is an enlarged fragmentary sectional view taken along line 10—10 in Fig. 7.
Figure 11:
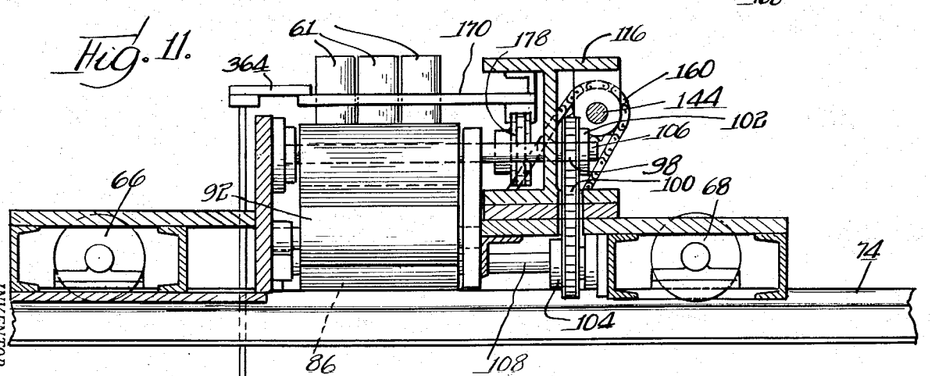
Fig. 11 is an enlarged fragmentary sectional view taken along line 11—11 in Fig. 8.

As shown best in Figs. 7, 8 and 10, the supply conveyor 36 comprises a moveable endless cable 120, and the cans 61 ride on and are advanced by the upper course of this cable. Intermediate portions of the upper and lower courses of the cable 20 are supported by a plurality of pulleys 122 and 124 spaced along the storage bin, and the cable is wrapped around suitable supporting and drive pulley means, not shown, located at or beyond the opposite ends of the storage bin. Stationary cables 126 and 128 are disposed above and respectively inwardly and outwardly of the upper course of the movable cable 120 for engaging the sides of the cans and retaining the cans on the movable cable. The stationary cables also extend at least for the length of the storage bin and are supported by suitable means.

It will be seen that in order to enable the stripper member 110 to direct the cans from the supply conveyor 36 onto the distributing conveyor 82, the inner stationary cable 126 is disengaged from the cans when the cans become aligned with the distributing conveyor 82. This is accomplished by wrapping the cable 126 about a pulley 130 mounted on the carriage 64 adjacent the forward edge of the conveyor belt 82 and disposed for rotation about a substantially vertical axis. From the pulley 130 the cable 126 extends forwardly and around a pulley 132 disposed for rotation about an axis inclined to the axis of the pulley 130 and also mounted on the carriage 64. The cable 126 extends rearwardly from the pulley 132 beneath the belt 82 into suitable securing means, not shown, at the rear end of the storage bin. With this structure it is seen that the point at which the cable 126 is disengaged from the cans is always constant with respect to the distributing means 62 varies with respect to the storage bin as the distributing means is moved along the storage bin.

Figure 12:
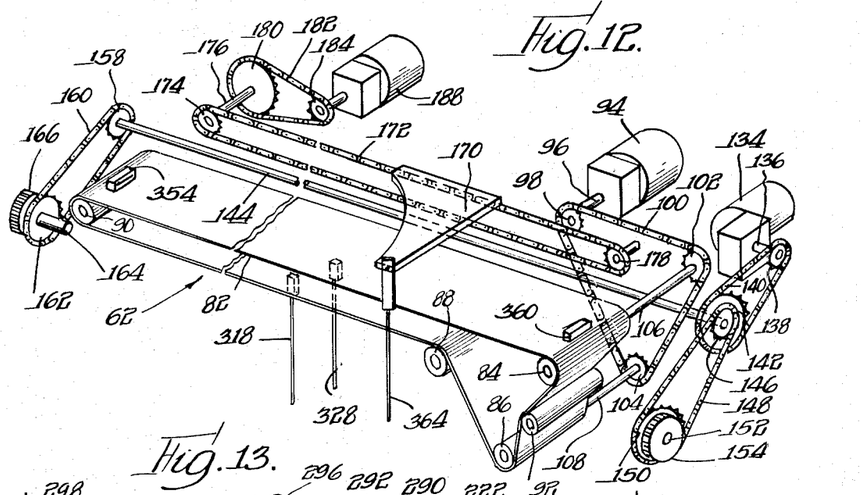
Fig. 12 is a diagrammatic perspective view showing drive and control elements for the can or article distributing means shown best in Figs. 7 through 11.

In order to distribute the cans longitudinally within the storage bin, the distributing means 62 is provided with means for shifting it substantially from one end of the storage bin to the other. This means comprises a motor and speed reducing unit 134 mounted on the carriage 64 and having an output shaft 136. A sprocket 138 is mounted on the shaft 136, and a drive chain 140 extends around this sprocket and a sprocket 142 mounted at one end of a shaft 144 which substantially traverses the carriage. Another sprocket 146 is mounted on the end of the shaft 144 adjacent the sprocket 142 and a drive chain 148 extends around the sprocket 146 and a sprocket 150 mounted on a shaft 152 rotatably supported on the carriage. The shaft 152 also carries a gear 154 which is adapted to mesh with a rack member 156 extending along the side 54 of the storage bin and preferably supported by the bracket 80. The opposite end of the shaft 144 carries a sprocket 158 which drives a chain 160 wrapped around a sprocket 162 similar to the sprocket 150. The sprocket 162 is fixed on a shaft 164 rotatably carried by the carriage 64, and a gear 166 is also fixed on the shaft and is adapted to mesh with an elongated rack member 168 extending along the side 52 of the storage bin and supported by the bracket 78.

In order to distribute the cans or articles transversely within the storage bin, the distributing means 62 is provided with a stripper member 170 which is adapted to be reciprocated longitudinally with respect to the conveyor belt 82 and transversely with respect to the storage bin for directing the cans or articles from the conveyor belt 82 in the desired manner. The stripper member 170 which is disposed above the conveyor belt 82 extends between the guide rails 112 and 114 and is connected to an actuating chain 172. The chain extends around a drive sprocket 174 which is mounted on a rotatably supported shaft 176 and around an idler sprocket 178 which is suitably rotatably supported. The drive shaft 176 also carries a sprocket 180 which is driven by a chain 182 also extending around a sprocket 184 fixed on an output shaft 186 of a reversible motor and speed reducing unit 188 mounted on the carriage 64.

As will be understood, the cans, if permitted to drop freely from the distributing conveyor 82 directly to the bottom of the storage bin, would become dented or crushed. Therefore, in accordance with the features of the present invention means is provided for limiting the free fall of cans or the like from the distributing conveyor in a manner which prevents the cans from becoming injured. This means is shown in Figs. 1, 2, 4, 5 and 6 and includes a plurality of trough-like baffles or cascades 190 secured to the front wall 56 of the storage bin in inclined and stepped relationship. It will be observed that the uppermost cascade or baffle 190 is disposed adjacent one upper corner of the storage bin and the lowermost baffle or cascade 190 is disposed toward an opposite lower corner of the storage bin and above a discharge door 192 hinged to a lower margin of the end or wall 56. An inclined baffle or cascade 194 is disposed between the lowermost cascade 190 and extends substantially to the bottom of the storage bin. The cascade 194 may be substantially flat as shown or trough shaped. The cascade 194 may be removably mounted in the position shown in Fig. 5 during initial filling of the storage bin with containers or mounted on the door 192 so that when the door is opened and the containers are discharged through the door opening, the cascade 194 will not interfere with the containers.

When initially filling the storage bin, the distributing means 62 is positioned so that the forward edge of the conveyor belt 82 is disposed over the cascades and the stripper member 170 is positioned so as to direct the cans or containers from the belt 82 onto the uppermost cascade 190. The distance between the uppermost cascade 190 and the conveyor belt 82 is sufficiently small to prevent the containers from being injured when they fall from the belt and onto the uppermost cascade. The containers advance in a step-by-step manner down the cascade until they reach the lowermost cascade 194 from which they fall onto the bottom of the storage bin. The cascades are inclined and stepped so that the cans or containers will not slide fast enough or drop far enough to cause injury thereto. As the number of cans sliding down the cascade increases, they begin to pile up adjacent the lowermost cascade as indicated by the broken lines 196 and 197 in Figs. 1 and 2. As the supply of cans continues, the pile on the bottom of the storage bin increases in size and the lower cascade are successively blocked so that the cans fall from successive cascades onto the pile which increases in height in accordance with the increased elevation of the successive cascades. It will be appreciated that the pile of cans will inherently be formed so that it has a back slope of about 45° and that the pile will have its greatest depth and width at the side 52 of the storage bin adjacent the highest cascade. The manner in which the pile is initially formed is indicated by the broken lines 198, 200, 202, 204 and 206. After the initial pile of cans is formed as indicated by the broken lines in Figs. 1 and 2, the stripper member 170 is actuated so as to distribute the cans in a manner which causes the pile to be formed with a generally uniform depth and width entirely across the storage bin. Control means which is described below is provided for actuating the stripper member to accomplish the initial uniform piling of the cans across the storage bin and also for subsequently actuating the stripper member 170 and the carriage means 64 so as to continue to distribute the cans uniformly across and longitudinally of the storage bin.

Figure 1:
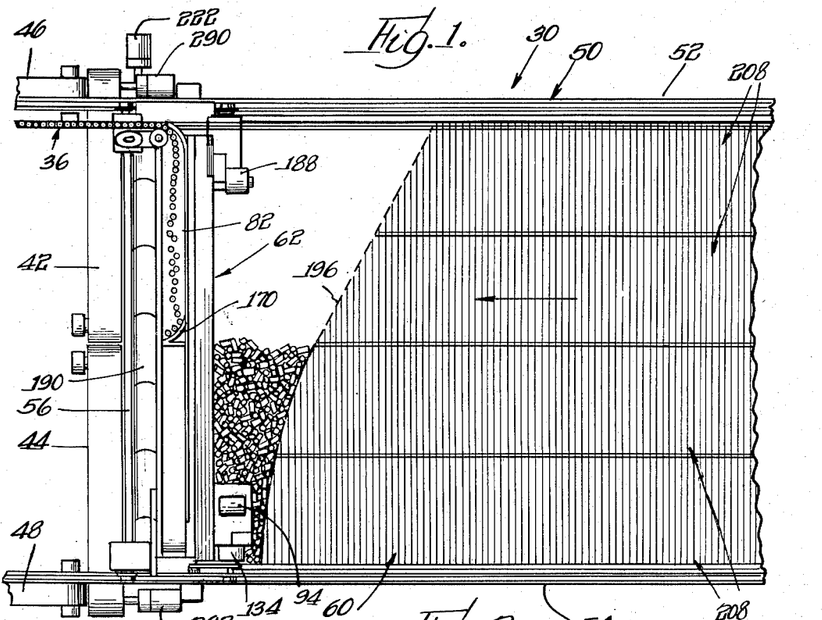
Fig. 1 is a fragmentary plan view showing a structure incorporating the features of the present invention.

The movable bottom or conveyor means 60 of the storage bin may be conveniently formed by a plurality of conveyor sections 208 as shown in Fig. 1. The conveyor sections 208 are substantially identical so that only one of them need be described in detail, and for details of the conveyors 208, reference is made to Figs. 14, 15, 16, 17 and 18. As shown in these figures, a pair of sprocket shafts 210 and 212 is rotatably mounted, respectively, adjacent the forward and back ends of the storage bin. The shaft 210 carries sprockets 214 and 216, and the shaft 212 carries sprockets 218 and 220. It is understood that these shafts also carry additional sprockets, not shown, for the additional conveyor sections 208 omitted from the fragmentary view shown in Fig. 15. A suitable motor 222 and speed reducing unit is provided for driving the shaft 210 as shown in Fig. 1.

An endless chain 224 extends around the sprockets 214 and 218 and a similar endless chain 226 extends around the sprockets 216 and 220. As shown best in Fig. 16 the chain 224 comprises a series of pairs of link members 228 and 230 and alternate pairs of link members 232 and 234 connected by pins 236. Rollers 238 having diameters greater than the width of the link members are respectively carried by each of the pins 236. Each of the link members 230 and 234 carries an inwardly extending flange or tab 240 or 242 respectively for supporting one end of a transverse slat 244 preferably formed from wood or any other suitable relatively soft material which will reduce the possibility of injury to the cans. The endless chain 226 includes link members and rollers substantially identical to the corresponding elements of the chain 224 so that they need not be described in detail, but it should be noted that all of the link members of the chain 226 are provided with flanges or tabs similar to the flanges 240 and 242 for supporting the slats of the conveyor sections at the opposite sides of the chain 226.

Figures 16, 17:
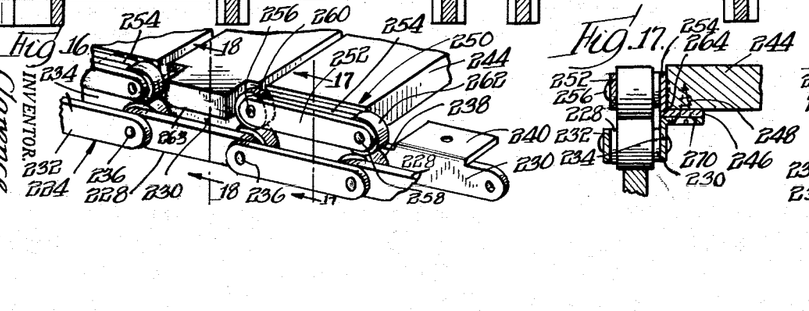
Fig. 16 is a fragmentary perspective view showing a portion of the conveyor means providing a movable bottom for the storage bin.
Fig. 17 is a fragmentary sectional view taken along line 17—17 in Fig. 16.
Figure 18:
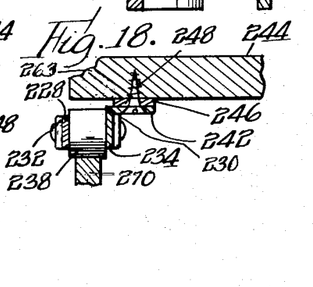
Fig. 18 is a fragmentary sectional view taken along line 18—18 in Fig. 16.

The slats 244 may be secured to the flanges carried by the chains by any suitable means, and as shown in Figs. 17 and 18, a spacer plate 246 is disposed adjacent the end of each slat and one or more screws 248 extend through the flanges and spacer plates and into the slats. It should be noted that roller assemblies 250 are mounted at the opposite ends of spaced slats 244 for the purpose described below. Preferably, these assemblies are secured to every other slat and they include a pair of link-like members 252 and 254 having their opposite ends connected by pins 256 and 258, which pins carry rollers 260 and 262. Each link-like member 254 is secured to or made as a flange 264 extending from the spacer plate 246 of the associated slat member. Each of the slats not carrying a roller assembly 250 has an extension 263 projecting between the roller assemblies to prevent the cans from being caught in the space between the roller assemblies.

Figure 15:
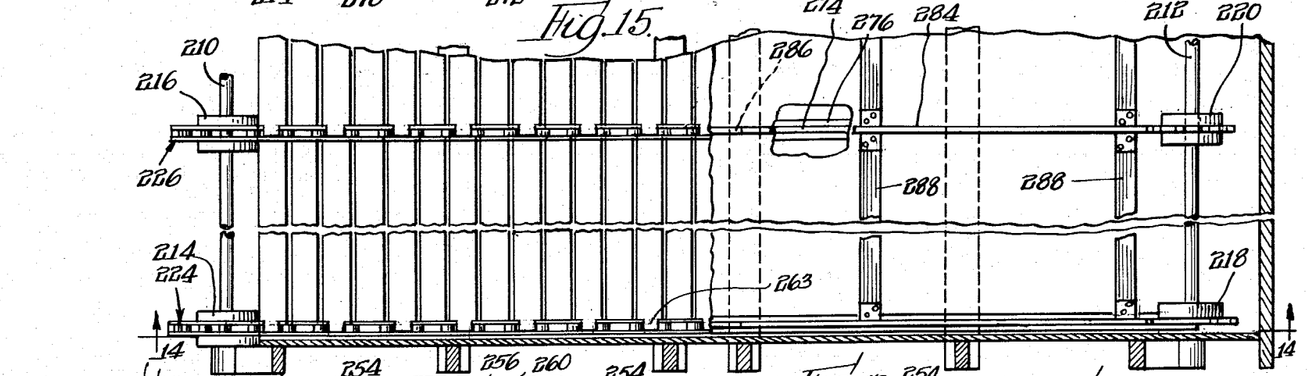
Fig. 15 is a fragmentary sectional view taken along line 15—15 in Fig. 2.

It will be appreciated that the bottom conveyor means which extends substantially the full length of the storage bin will be quite long and for the size of storage bin mentioned above, the bottom conveyor means will be about 100 feet long. The structure is provided with means for supporting the relatively long upper and lower courses of the bottom conveyor means, which support means is sufficiently strong to withstand the weight of the conveyor means and cans thereon and, in addition, is constructed so as to permit the conveyor means to move freely and to occupy a minimum of space. More specifically, a support rail 270 is mounted on a rigid frame member 272 beneath the chain 224, and the rollers 260 and 262 on the lower course of the chain 224 roll on the rail 270 and prevent the chain from engaging the rail with sliding contact. A similar rail 274 is mounted on a frame member 276 beneath the chain 226. In order to support the upper course of the chain 224, inclined rail members 278 and 280 are disposed adjacent and extend inwardly from the sprockets 214 and 218, respectively, and are connected by a narrow elongated rail 282. The rollers 238 in the upper course of the chain 224 ride on the rail members 278, 280 and 282. The rail members 278, 280 and 282 engage and are supported by the rollers 238 on the lower course of the chain 224. Thus, the weight of the upper course of the conveyor means and the cans thereon is transmitted to the rails 278, 280 and 282 and the lower course of the conveyor means to the bottom rails, which are disposed on rigid frame members. It is understood that rail members similar to the members 278, 280 and 282 are provided for the chain 226, and Fig. 15 is broken away to show portions of rail members 284 and 286 which correspond to the members 280 and 282. A plurality of frame members 288, only one of which is shown, extends between the rail members respectively cooperable with the chains 224 and 226 for preventing lateral displacement of the rail members.

Figure 13:
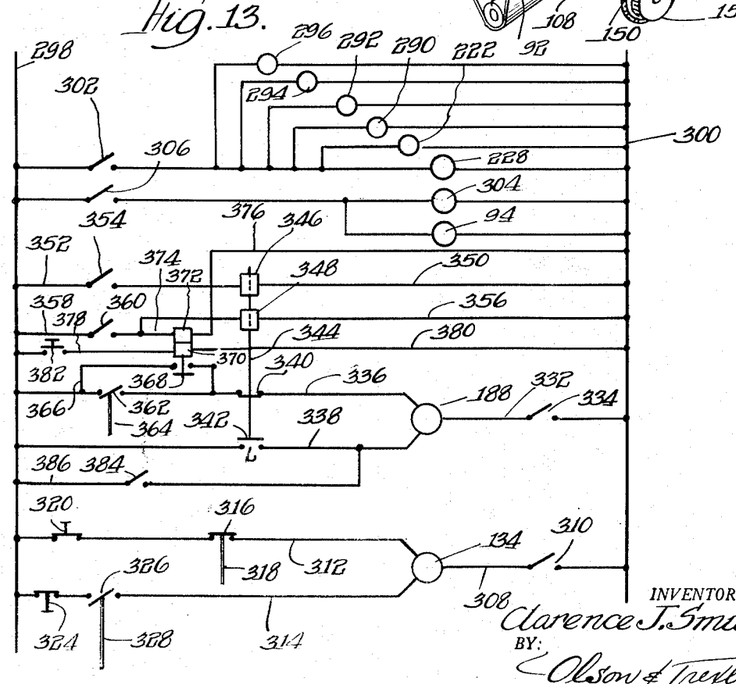
Fig. 13 is a diagrammatic view of a control circuit for the apparatus of this invention.
Figure 14:
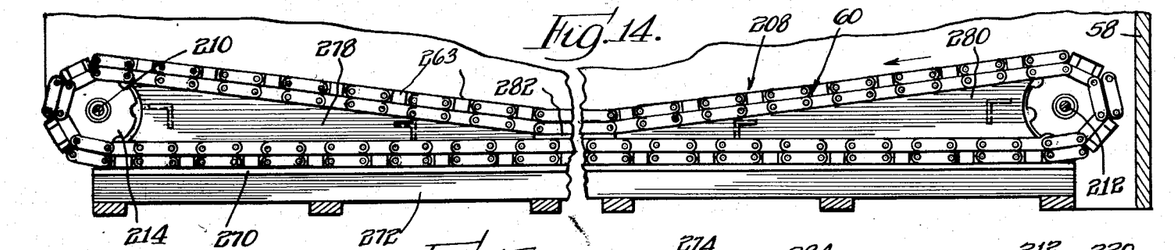
Fig. 14 is a fragmentary sectional view taken along line 14—14 in Fig. 15.

With reference to Figs. 2, 4, 12 and 13, the manner in which the apparatus of this invention is operated and the control means therefor will be described. When cans within the storage bins are to be discharged therefrom, the door 192 is opened and the motor 222 for driving the bottom conveyor means is energized. At the same time motors 290 and 292 for driving the take-off conveyors 42 and 44, respectively, are energized as are motors 294 and 296 which drive the conveyors 46 and 48. As shown in Fig. 13, all of these motors may be connected between power lines 298 and 300 and may be controlled by a single switch 302. It will be appreciated that as the bottom conveyor means is driven, cans in the storage bin will be advanced through the opened door in the end 56 and separate portions of the cans will fall on the conveyors 42 and 44 and will be carried by these conveyors to the conveyors 46 and 48 and subsequently to suitable unscrambling or orientating units and then to processing or filling machines.

When cans or articles are to be deposited in the storage bin, a motor 304 for driving the supply conveyor is energized by closing a switch 306. Preferably, the motor 94 for driving the conveyor belt 82 of the distributor means is connected as shown in Fig. 13 so that it is also energized when the switch 306 is closed.

The reversible motor 134 which functions to drive the distributing means 62 forwardly and rearwardly between the front and back ends of the storage bin has one terminal connected with the line 300 by a wire 308 having a manual switch 310 therein. Another terminal of this motor is connectable with the line 298 by a wire 312 for energizing the motor so as to drive the distributing means forwardly, and the motor is also connectable with the line 298 by a wire 314 for energizing the motor so as to drive the distributing means rearwardly. A switch 316 is connected in the wire 312 and mounted on the carriage 64, which switch is adapted to be actuated by a probe 318 depending from the carriage as shown in Figs. 2 and 12 for engagement with cans piled in the storage bin. A normally closed limit switch 320 is also connected in the wire 312 and is mounted on a forward portion of the carriage 64 for engagement with an abutment 322 disposed adjacent the forward end of the storage bin as shown in Fig. 2. A similar normally closed limit switch 324 is connected in the wire 314 and is disposed on the carriage 64 for engagement with an abutment, not shown, similar to the abutment 322 but mounted adjacent the back end of the storage bin. Another switch 326 is connected in the wire 314 and is adapted to be actuated by a probe 328 depending from the carriage means as shown in Figs. 2 and 12 for engagement with a pile of cans within the storage bin. It should be noted that the probe 318 is located forwardly of the probe 328 so that the probe 318 will engage a pile of cans prior to engagement of the probe 328 with the cans. Furthermore, it should be noted that the switch 316 is constructed so that it is closed when the probe 318 hangs freely without engaging the pile of cans while the switch 326 is constructed so that it is opened when the probe 328 hangs freely without engaging the cans. Thus, when both probes are hanging freely, the motor 134 will be energized through the wire 312 so as to drive the carriage forwardly. Assuming that there is a pile of cans in the storage bin of sufficient height to engage the probe 318, the carriage will move forwardly until the probe 318 engages the pile of cans whereupon the switch 316 will open to deenergize the motor. However, if there is no pile of cans in the storage bin of sufficient height to engage the probe 318, the carriage will move forwardly until the limit switch 320 is opened by engagement with the abutment 322 which is located so as to stop the carriage in position to discharge cans onto the cascades. In either event, the carriage will remain stationary until the pile of cans has increased sufficiently in size as indicated by the broken line 330 to engage the probe 328 and close the switch 326. When the switch 326 is closed the carriage will be driven rearwardly to permit distribution of the cans longitudinally within the storage bin. The movement of the carriage rearwardly will be only sufficient to disengage the probe 328 from the pile of cans wherein cans being discharged from the distributing means conveyor 82 will always fall onto the pile at or near the top thereof. It will be appreciated that if the pile of cans continues to increase in size the carriage will be intermittently moved rearwardly. It will also be appreciated that in the event the cans are being discharged from the storage bin faster then they are being supplied thereto the size of the pile will decrease, and when the pile recedes from the distributing means sufficiently to disengage from the probe 318, the carriage will be driven forwardly until the probe 318 again engages the pile. Assuming that the size of the pile continues to decrease the carriage will be intermittently driven forwardly so that incoming cans are always deposited on or adjacent the top of the pile.

As mentioned herein above the stripper member 170 of the distributing means is normally reciprocated by the reversible motor 188 so as to distribute the cans evenly transversely of the storage bin. In order to accomplish this, the motor 188 is connected to the line 300 by wire 322 having a manual shutoff switch 334 connected therein. The motor is also connectable with the line 298 by the wire 336 for energizing the motor to drive the member 170 toward the right as viewed in Fig. 12, and the motor is connectable with the liner 298 by a wire 338 for driving the member 170 toward the left. Switch members 340 and 342 are disposed for alternately opening and closing the wires 336 and 338, respectively, which switch members are carried by a member 344 adapted to be snapped into alternate positions by solenoids 346 and 348. The solenoid 346 is connected with the line 300 by the wire 350 and with the line 298 by wire 352 having a momentary contact limit switch 354 therein. The limit switch 354 is mounted on the carriage means 64 adjacent the left end thereof for engagement with the member 170 so that when it is closed by the member 170, the solenoid 346 will be energized. This causes the member 344 to be snapped to the position shown in Fig. 13 so that the wire 338 is opened and the wire 336 is closed and the motor 188 is energized to drive the member 70 toward the right. The solenoid 348 is connected with the line 300 by a wire 356 and to the line 298 by wire 358 having another momentary contact limit switch 360 therein. This switch is disposed on the carriage means so as to be closed when the member 170 reaches the right hand limit of its travel. As will be understood, when the switch 360 is momentarily closed the solenoid 348 is energized so as to actuate the member 344 to open the switch 340 and close the switch 342.

While the stripper member 170 is normally actuated and controlled in the preceding paragraph, after a pile of cans has been built up in the storage bin, means is provided for preventing the stripper member 170 from reciprocating during the initial build up of a pile of cans. More specifically, a switch 362 is connected in the wire 336, which switch is normally open and is adapted to be actuated and closed by a probe 364 depending from the member 170 for engagement with the cans. Wire 366 is connected with the wire 336 so as to bypass the switch 362, which wire 366 is adapted to be opened by a switch 368. The switch 368 is adapted to be snapped to and from opened and closed positions by solenoids 370 and 372, respectively. The solenoid 372 is connected with the wire 358 by a wire 374 and with the line 300 by a wire 376 so that it will be energized to close the switch 368 when the stripper member 170 reaches the right end limit of its travel and the limit switch 360 is closed. The solenoid 370 is connectable with the line 298 by normally open wire 378 and to the line 300 by a wire 380. The solenoid 370 is energized to open the switch 368 when a manually operated reset switch 382 connected in the wire 378 is momentarily closed.

The manner in which the control means 62 is operated during initial filling of an empty or substantially empty storage bin is as follows. The master switches 310 and 334 for the motors 134 and 188 are, of course, closed and a reset button 382 is actuated so as to insure that the switch 368 is open. Since the probe 318 and 328 are both hanging freely in the absence of containers with the storage pin, the carriage is driven forwardly until stopped by the limit switch 320. The probe 364 also hangs freely so that the switch 362 is opened and since the switch 368 has already been opened, the motor 188 cannot be energized to drive the stripper member 170 toward the right. In the event that the switch 342 was closed when the apparatus was last stopped, the motor 188 will be energized so as to drive the member 170 toward the left until the limit switch 354 is closed. However, if the switches 340 and 342 are in the position shown in Fig. 13, and the stripper member 170 is not in its extreme left-hand position, a manual switch 384 in a wire 386 bypassing the switch 342 is closed so as to energize the motor to move the stripper member 170 to the extreme left-hand position. When the carriage and the stripper member have been positioned in the manner just described, the cans will be directed from the belt 82 onto the uppermost cascade 190. The stripper member 170 will remain stationary and the cans will be directed onto the uppermost cascade until the pile has been built up in the manner described above and so that the surface of the pile is disposed generally along the broken line 390 shown in Fig. 4. Then the probe 364 is engaged by the cans and the switch 362 is closed so that the stripper member is moved toward the right to distribute the cans transversely of the storage bin. The stripper member moves toward the right until the probe 364 is moved out of contact with the pile of cans whereupon the switch 362 is opened and the stripper member remains stationary until a sufficient number of cans has been deposited to build up the pile to again engage the probe. The stripper member is moved in a step-by-step manner until it has completely traversed the storage bin and the pile has been built up evenly substantially entirely across the storage bin. When the stripper member reaches the right-hand limit of its travel and engages and closes the limit switch 360, the solenoid 372 is energized to close the switch 368 whereby the switch 362 is bypassed. Thereafter the stripper member will be continuously reciprocated under the control of the limit switches 354 and 360.

Figure 23:
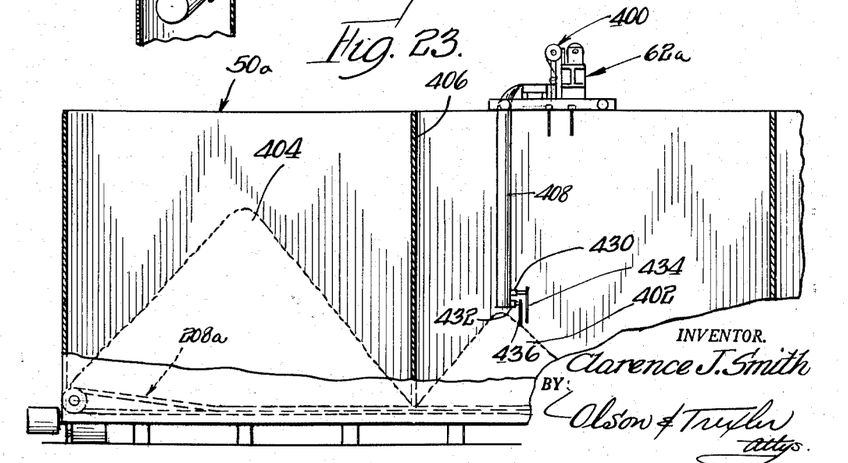
Fig. 23 is a fragmentary side elevational view showing the manner in which the modified form of the present invention may be operated.

In Figs. 19 through 23 there is shown a modified form of the present invention which is similar to the above described structure as indicated by the application of identical reference numerals with the suffix "a" added to corresponding elements. This embodiment differs in that the above described cascades for controlling the fall of the cans or articles may be eliminated, and means 400 is provided on the distributing means for controlling the fall of the articles. This arrangement has the advantage that the pile of articles or cans may be started at any desired location within the storage bin. Thus, as shown in Fig. 23, a pile 402 of cans or articles may be formed in the storage bin independently of a previously formed pile 404, and if desired, the cans in the different piles may be of different sizes. Of course, the cans in the different piles may be of the same size, but in the event they are of different sizes, a temporary partition 406 may be provided in the storage bin to insure separation of the different piles of cans.

Figure 19:
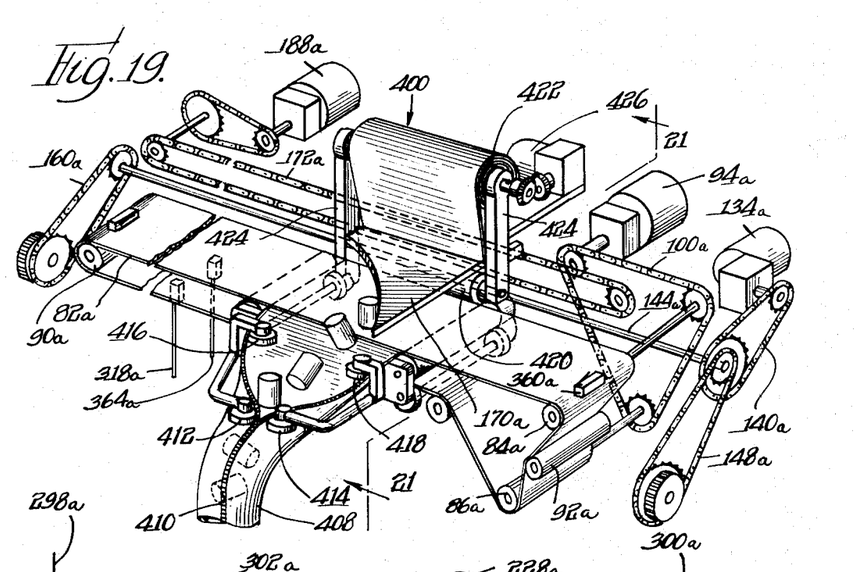
Fig. 19 is a somewhat diagrammatic perspective view showing a modified form of the present invention.

The above mentioned means 400 for depositing the cans from the distributing means into the storage bin comprises an elongated flexible tube or chute member 408 having a longitudinally extending zipper 410. One end portion of the tube member 408 depends from the distributing means carriage. An upper portion of the tube member extends between rollers 412 and 414 which serve to close the zipper and then around rollers 416 and 418 which serve to open the zipper and spread the tube-like member.

From the rollers 416 and 418 the opened tube-like member passes beneath the distributing conveyor 82a and upwardly around a roller 420 to a take-up roller 422. These rollers and the tube-like member are carried on frame means 424 along with the stripper member 170a, which frame means is connected to and reciprocated by the chain 172a. A suitable reversible motor drive 426 is mounted on the frame means 424 for rotating the take-up roller 422 so as to extend or retract the tube-like member.

Figure 20:
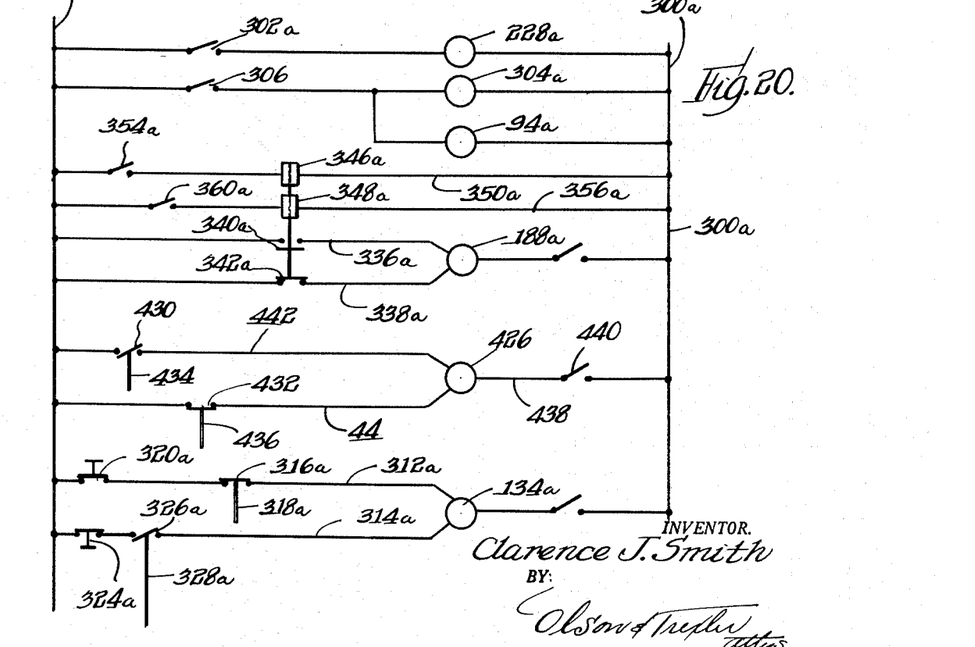
Fig. 20 is a diagrammatic view of a control circuit for taken generally along line 21—21 in Fig. 19.
Figures 21, 22:
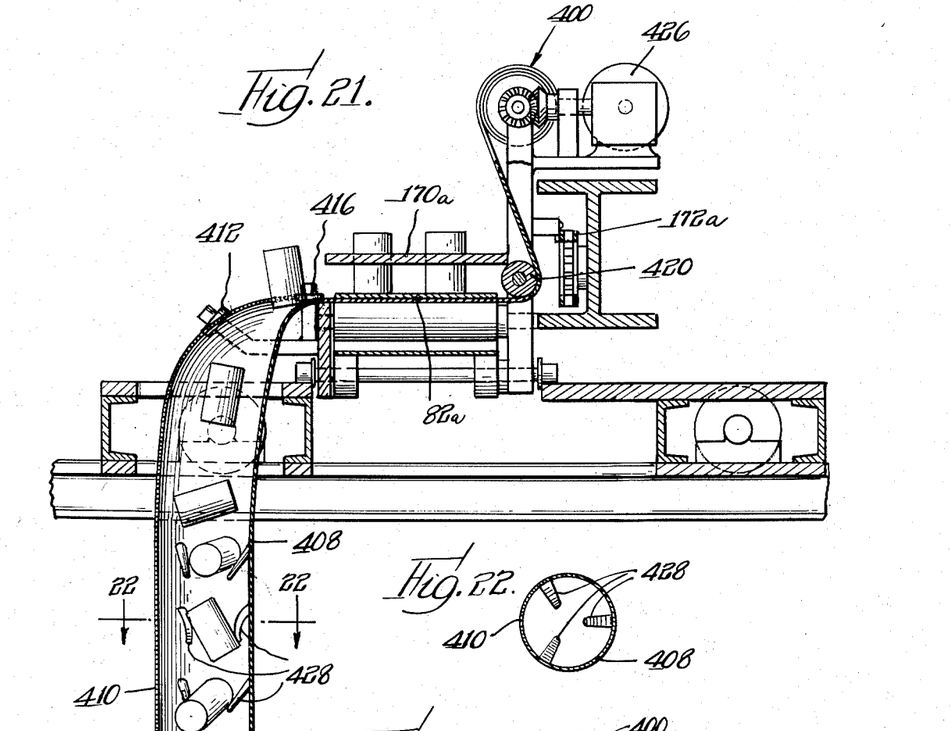
Fig. 21 is an enlarged fragmentary sectional view taken generally along lne 21—21 in Fig. 19.
Fig. 22 is a sectional view taken along line 22—22 in Fig. 21.

As will be understood, the cans or articles are directed from the distributing conveyor belt 82a so that they fall into the opened upper portion of the tube-like member 408 and pass downwardly through the depending closed portion in a controlled manner to the bottom of the storage bin or onto a pile of cans or articles. Preferably, a plurality of flexible elements or fins 428 extend within the tube-like member for controlling the fall of the cans therethrough. Switches 430 and 432 respectively having probes 434 and 436 depending for engagement with the bottom of storage bin or the pile of cans or articles are mounted on the lower end of the tube 408. As shown in Fig. 20 the reversible motor 426 is connected with the line 300a by a wire 438 having a manually operable switch 440 therein. The motor is connectable with the line 298a by a wire 442 having the switch 430 therein so that when the switch 430 is closed the motor is energized to retract or raise the tube-like member. A wire 444 having the switch 432 therein connects the motor with the line 298a so that when the switch 432 is closed, the motor is actuated to extend or lower the tube-like member. It should be noted that the switches 430 and 432 are constructed so that they are respectively normally opened and closed. Furthermore, the probe 436 is located so that it extends below the probe 434. Thus, when the tube member 408 is in a retracted or elevated position substantially above the bottom of the storage bin or the pile of cans, the switch 432 will be closed and the tube member will be lowered until the probe 436 is actuated to open the switch. At this time, the probe 434 is still above the pile of cans or the bottom of the storage bin as the case may be so that the tube member remains at a fixed elevation until the pile of cans increases sufficiently to actuate the probe 434 and close the switch 430. Then the tube member will be raised sufficiently to disengage the probe 434 from the pile of cans.

While the preferred embodiments of the present invention have been shown and described herein, it is obvious that many structural details may be changed without departing from the spirit and scope of the appended claims.

The invention is claimed as follows:

1. A storage structure for cans or other articles comprising a storage bin, article distributing means above said storage bin, and means disposed for controlling the fall of articles from said distributing means into the storage bin for restraining injury to the articles, said distributing means comprising carriage means extending transversely of the storage bin and mounted for movement longitudinally of the storage bin, conveyor means on said carriage means and extending transversely of said storage bin, and stripper means on said carriage means and mounted for reciprocable movement along said conveyor means for distributing articles from the conveyor so as to spread the articles transversely of the storage bin.

2. A storage structure for cans or other articles comprising a storage bin, and article distributing means above said storage bin, said distributing means comprising carriage means extending transversely of the storage bin and mounted for movement longitudinally of said storage bin, conveyor means on said carriage means extending transversely of the storage bin, means on said carriage means and movable along said conveyor for directing articles from the conveyor, and means for moving said carriage means back and forth with respect to the storage bin in accordance with the size of the pile of articles in said storage bin.

3. A storage structure for cans or other articles comprising a storage bin, and article distributing means mounted above said storage bin, said distributing means comprising carriage means extending transversely of the storage bin and mounted for movement longitudinally of the storage bin, conveyor means on said carriage means and extending transversely of said storage bin, stripper means on said carriage means and reciprocable along said conveyor means for directing articles from the conveyor means so as to spread the articles transversely of the storage bin, means for initially maintaining said stripper means in position for directing articles from the conveyor means onto means within the storage bin which controls the fall of the articles until a pile of articles of predetermined size is formed within the storage bin and for subsequently reciprocating said stripper means.

4. A storage structure for cans or other articles comprising a large storage bin, article distributing means mounted above said storage bin, and cascade means mounted within said storage bin for controlling the fall of articles from said distributing means into the storage bin for restraining injury to the articles, said distributing means including a carriage mounted for movement longitudinally of the storage bin, a conveyor mounted on the carriage and extending transversely of the storage bin, a stripper member mounted on said carriage means for reciprocable movement along said conveyor for directing articles from the conveyor so as to spread the articles transversely of the storage bin, and means for initially positioning the carriage and stripper member for directing articles onto said cascade means at one side of said storage bin until a pile of articles of predetermined size has been formed in the storage bin and for subsequently actuating said stripper member toward the opposite side of the storage bin in accordance with the size of the article pile.

5. A storage structure for cans or other articles comprising a storage bin, an article supply conveyor extending along said storage bin, distributing means mounted for movement above said storage bin and along said supply conveyor for receiving articles from the supply conveyor at different locations along the storage bin and distributing articles throughout the storage bin, means carried by said distributing means for directing articles from the conveyor to said distributing means, means disposed for controlling the fall of articles from said distributing means into the storage bin for restraining injury to the articles, and drive and control means associated with said distributing means and including probe means engageable with an article pile in the storage bin for automatically moving said distributing means along said conveyor and over said storage bin for distributing articles throughout the storage bin in accordance with the size and location of an article pile within the storage bin.

6. A storage structure for cans or other articles comprising a storage bin, an article supply conveyor extending along said storage bin and including an elongated flexible side guide member, article distributing means mounted for movement above said storage bin and along said supply conveyor for distributing articles throughout the storage bin, means carried by the distributing means for adjustably disengaging said guide member from articles on said supply conveyors, and means carried by said distributing means for directing articles disengaged by said guide member onto said distributing means.

7. A storage structure for cans or other articles comprising a storage bin, article distributing means mounted for back and forth movement above said storage bin for distributing articles into said storage bin, means disposed for controlling the fall of at least a portion of the articles from said distributing means into the storage bin for restraining injury to the articles, means providing a discharge opening in a wall of said storage bin, conveyor means providing a bottom for said storage bin and operable to direct articles through said discharge opening, and drive and control means associated with said distributing means and including probe means engageable with an article pile within the storage bin for automatically moving said distributing means back and forth in accordance with the size and location of an article pile within the storage bin.

8. A storage structure for cans or other articles comprising a large elongated storage bin, article distributing means mounted for movement above said storage bin for distributing articles throughout the storage bin, means disposed for controlling the fall of at least a portion of the articles from said distributing means into the storage bin for restraining injury to the articles, means providing a discharge opening in said storage bin, and conveyor means providing a bottom for said storage bin and operable to direct articles to said discharge opening, said conveyor means including a pair of parallel endless chains, a plurality of rollers carried by each of said chains, article supporting members extending between and secured to said chains, roller means carried by certain of said article supporting members, rail means disposed beneath and supporting roller means on article supporting members secured to lower courses of said chains, additional rail means engaging and supported by rollers on the lower courses of said chains and also engaging and supporting rollers on upper courses of said chains.

9. A storage structure for cans or other articles comprising a large elongated storage bin having a discharge opening through a lower portion of an end thereof, an article supply conveyor extending along one side of said storage bin, means for receiving articles from said supply conveyor and distributing the articles within said storage bin, said last named means including a carriage mounted for movement above and longitudinally of said storage bin, a distributing conveyor mounted on said carriage and extending transversely of said storage bin, and means mounted on said carriage for reciprocable movement along said distributing conveyor for directing articles from the distributing conveyor, means disposed for controlling the fall of at least a portion of the articles from said distributing conveyor into the storage bin for restraining injury to the articles, means for actuating said carriage longitudinally of the storage bin in accordance with the size of a pile of articles in the storage bin, and conveyor means providing a bottom for said storage bin and operable to direct articles to said discharge opening, said bottom conveyor means including endless means extending longitudinally of said storage bin and having a lower course supported by rail means disposed thereunder and supporting rail means disposed thereon, and an upper course supported by said last mentioned rail means.

10. In a storage structure for cans or the like, distributing means for distributing cans or the like throughout a storage bin, said distributing means including a reciprocable carriage, conveyor means mounted on said carriage, means mounted on said carriage for reciprocable movement along said conveyor means for directing cans or the like from said conveyor means, and means for actuating said carriage means in accordance with the size of a pile of cans or the like disposed in a storage bin and including switch means mounted on said carriage means and having depending probe means engageable with the pile of cans or the like.

11. Distributing means, as defined in claim 10, which includes means for actuating said reciprocable directing means, said last mentioned actuating means including switch means having a depending probe movable with said directing means for initially preventing movement of said directing means until said last mentioned probe is engaged by a pile of cans or the like formed in the storage bin.

12. A storage structure for cans or other articles comprising a storage bin, and article distributing means mounted above said storage bin for distributing articles throughout the storage bin, said distributing means including an elongated generally vertically retractable tube-like chute means for controlling falling of articles into the storage bin for restraining injury to the articles and mounted for movement transversely and longitudinally of the storage bin, said chute means comprising a flexible member, releasable fastening means joining longitudinal marginal portions of said member, and said distributing means comprising for opening and closing said fastening means at predetermined portions of the longitudinal margins of said flexible member when said member is raised and lowered respectively for providing said member with an open upper end at a predetermined location for receiving articles.

13. A storage structure for cans or other articles comprising a large storage bin, and means mounted for movement above said storage bin for distributing articles throughout said storage bin, said distributing means including carriage means, an elongated tube-like member retractably depending from said carriage means and having longitudinally extending zipper means, and means carried by said carriage means for opening an upper portion of said zipper means and said tube-like member to permit passage of articles into the tube-like member, a depending closed portion of said tube-like member serving to control the fall of articles from said carriage means into the storage bin for restraining injury to the articles.

14. A storage structure, as defined in claim 13, which includes a plurality of flexible elements secured to and extending within said tube-like member for restraining the fall of articles through the tube-like member.

15. A storage structure, as defined in claim 13, which includes means for raising and lowering said tube-like member, and means including a switch having a probe carried by said tube-like member and engageable with articles in the storage bin for controlling raising and lowering of said tube-like member.

16. A storage structure, as defined in claim 13, which includes means for actuating said carriage longitudinally of the storage bin in accordance with the size of a pile of articles in the storage bin, and means for reciprocating said tube-like member transversely with respect to the storage bin.

17. A storage structure for cans or other articles comprising a storage bin, an article supply conveyor extending along said storage bin, distributing means mounted for movement over said storage bin and associated with said supply conveyor for receiving articles from said supply conveyor and distributing the articles throughout the storage bin, means movable with the distributing means for directing articles from the conveyor onto the distributing means, and drive and control means associated with said distributing means and including detector means responsive to an article pile within the storage bin for moving said distributing means over said storage bin in accordance with the size and location of an article pile within the storage bin.

References Cited in the file of this patent

UNITED STATES PATENTS

| | | | |
|---|---|---|---|
| 872,983 | Archer | Dec. 3, | 1907 |
| 1,795,986 | Adams | Mar. 10, | 1931 |
| 1,795,987 | Adams | Mar. 10, | 1931 |
| 1,795,989 | Adams | Mar. 10, | 1931 |
| 2,685,375 | Huntzinger | Aug. 3, | 1954 |

UNITED STATES PATENT OFFICE
CERTIFICATE OF CORRECTION

Patent No. 2,868,395　　　　　　　　　　　　　　　　　　　January 13, 1959

Clarence J. Smith

It is hereby certified that error appears in the printed specification of the above numbered patent requiring correction and that the said Letters Patent should read as corrected below.

Column 2, line 54, strike out "taken generally along line 21-21 in Fig. 19;" and insert instead -- the modified structure shown in Fig. 19; --; line 56, for "lne 21-21" read -- line 21-21 --; column 3, line 3, for "or others" read -- on others --; column 4, line 12, after "62" insert -- but --; column 5, line 17, for "cascade", first occurrence, read -- cascades --; line 26, for "cascade" read -- cascades --.

Signed and sealed this 19th day of May 1959.

(SEAL)
Attest:

KARL H. AXLINE
Attesting Officer

ROBERT C. WATSON
Commissioner of Patents